(No Model.)

I. H. FRIDENBERG.
Cooling and Ventilating Cars.

No. 237,009. Patented Jan. 25, 1881.

WITNESSES:

INVENTOR

ATTORNEY

UNITED STATES PATENT OFFICE.

ISAAC H. FRIDENBERG, OF PHILADELPHIA, PENNSYLVANIA.

COOLING AND VENTILATING CARS.

SPECIFICATION forming part of Letters Patent No. 237,009, dated January 25, 1881.

Application filed August 25, 1880. (No model.)

*To all whom it may concern:*

Be it known that I, ISAAC H. FRIDENBERG, a citizen of the United States, residing in Philadelphia, in the county of Philadelphia, and State of Pennsylvania, have invented a new and useful Improvement in Cooling and Ventilating Cars, &c., of which the following is a specification, reference being had to the accompanying drawings, wherein—

Figure 1:
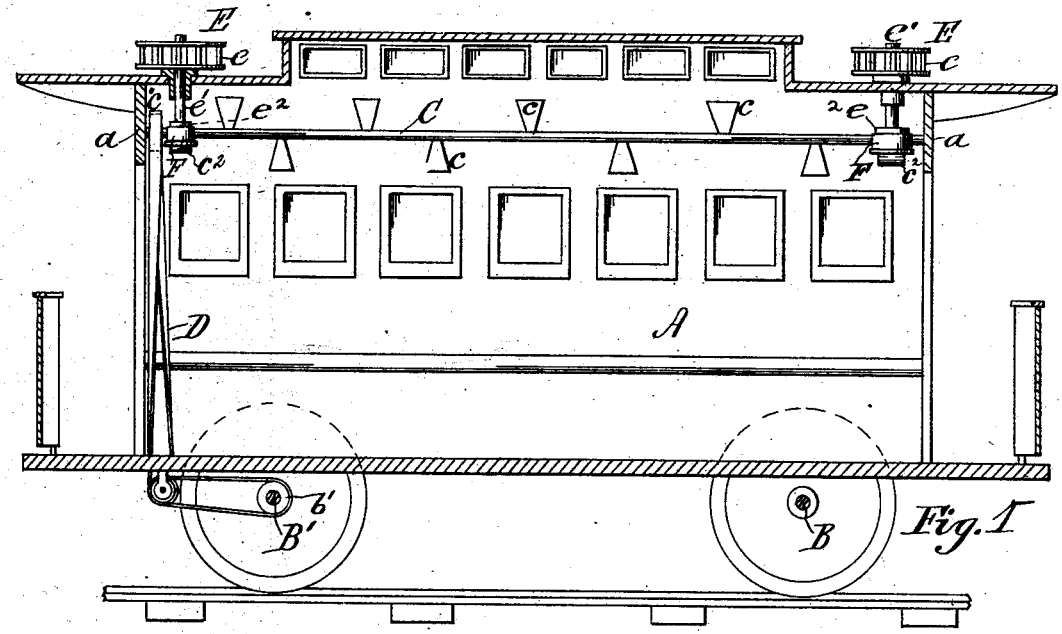
Figure 2:
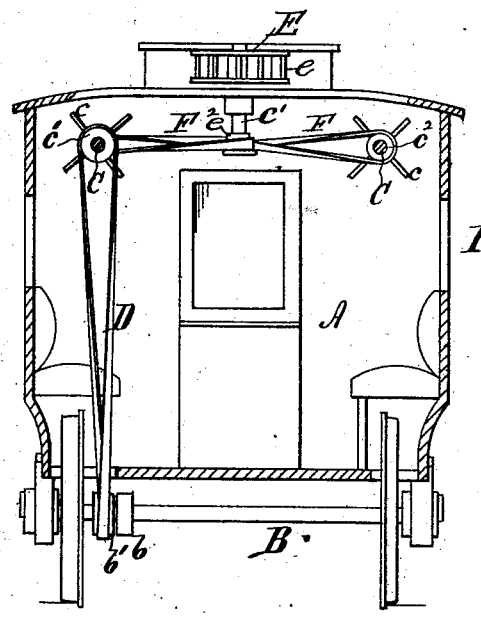

Figure 1 is a longitudinal vertical section of a car with my improvement applied thereto, and Fig. 2 is a transverse vertical section of the same.

My invention has for its object to provide means for cooling and ventilating railroad-cars and other vehicles; and my invention accordingly consists of one or more shafts placed longitudinally or otherwise within the car near the roof, which are provided with fan blades or beaters, and have belts or other connections with one of the axles of said car and with an air turret or wheel placed on the roof of the same, whereby, when car is in motion, said beaters will be revolved to agitate the air therein to reduce its temperature, so as to keep said car cool and pleasant for the passengers; or, if desired, said shafts may be operated by the revolutions of the air-turret wheel, or be so arranged that while the car is in motion the fan-shafts will be operated from the axles, and when not in motion said shafts will be revolved by the turret air-wheel. The fanning of the air in the car also prevents the entrance through the open windows of dust, cinders, and smoke from the engine and road.

Referring to the accompanying drawings, A represents the car-body; B B, the axles thereof, one of which is provided with a fast and loose pulley, $b$ $b'$.

C C are shafts running longitudinally with the car, on either side of the same, near the roof, and having bearings in the side of the car, as shown at $a$ $a$. Said shafts are provided with blades or beaters $c$ $c$ at proper intervals thereon, and also with pulleys $c'$ $c^2$. From the pulley $c'$ proceeds a belt, D, which connects with the fast and loose pulleys $b$ $b'$ on the axle B.

E E are turrets having air-wheels $e$ $e$ above the roof of the car, the shafts C' of which extend down into the car, and are provided with pulleys $e^2$ $e^2$. From the latter proceed belts F, which engage with pulleys $e^2$ $e^2$ on the shafts C C.

The operation is as follows: The car being in motion and the belts D being shifted to fast pulley $b$ on the axle B, the shafts C are rotated, the blades or beaters $c$ revolving agitate the air in the car and keep up a draft to cool the said air; or, when there is wind to turn the air-wheels $c$ $c$ in the turret E, the shafts C C may be revolved by said air-wheels through the connections F. In either case the result is the same. The air in the car being agitated, its tendency of motion is to the open window; consequently any dust or dirt seeking entrance therethrough is carried off by the said air and prevented from entering the car, while the air in the latter keeps at a cool and pleasant temperature.

It will be obvious that the combination of turret air-wheels with the fan-shafts will enable the latter to be operated when the car is not in motion, as wind-currents sufficiently strong to drive the turret-wheels seldom fail to exist. By forming a connection with the car-axle the fan-shafts are driven when the car is in motion, and if, from any cause whatever, the fan-shafts should be disconnected from the axle the turret-wheels will suffice to turn said shafts.

I am aware that it is not broadly new to locate a fan-shaft at the roof of a car for the purpose of cooling the air therein, said shaft being operated from the axle of the car through the medium of proper gearing.

Having thus described my invention, what I claim, and desire Letters Patent for, is—

The combination of the longitudinal fan-shafts C, turret air-wheels E, and suitable belt or other connections with a railroad-car and the axle thereof, as and for the purpose set forth.

ISAAC H. FRIDENBERG.

Witnesses:
CHAS. C. SCHERF,
GEO. L. WAITT.